United States Patent
Palsson

(10) Patent No.: US 10,782,067 B2
(45) Date of Patent: Sep. 22, 2020

(54) MECHANICAL VAPOR RECOMPRESSION APPARATUS

(71) Applicant: HEDINN HF., Hafnarfjordur (IS)

(72) Inventor: Gunnar Palsson, Reykjavik (IS)

(73) Assignee: HEDINN HF., Hafnarfjordur (IS)

( * ) Notice: Subject to any disclaimer, the term of this patent is extended or adjusted under 35 U.S.C. 154(b) by 110 days.

(21) Appl. No.: 16/077,059

(22) PCT Filed: Feb. 10, 2017

(86) PCT No.: PCT/IS2017/050002
§ 371 (c)(1),
(2) Date: Aug. 10, 2018

(87) PCT Pub. No.: WO2017/138025
PCT Pub. Date: Aug. 17, 2017

(65) Prior Publication Data
US 2019/0049179 A1 Feb. 14, 2019

(30) Foreign Application Priority Data

Feb. 10, 2016 (IS) .......................... 050142

(51) Int. Cl.
*F26B 3/24* (2006.01)
*F26B 3/18* (2006.01)
*F26B 17/20* (2006.01)
*F26B 23/00* (2006.01)
(Continued)

(52) U.S. Cl.
CPC .................. *F26B 3/24* (2013.01); *F26B 3/18* (2013.01); *F26B 11/16* (2013.01); *F26B 17/205* (2013.01); *F26B 23/004* (2013.01); *F26B 25/04* (2013.01); *Y02B 30/52* (2013.01); *Y02P 70/405* (2015.11)

(58) Field of Classification Search
CPC .. F26B 3/24; F26B 25/04; F26B 11/16; F26B 17/205
See application file for complete search history.

(56) References Cited

U.S. PATENT DOCUMENTS 3,426,838 A    2/1969   Onarheim
4,058,907 A *  11/1977  Lipp .................... B01F 15/066
                                                  34/61

(Continued)

FOREIGN PATENT DOCUMENTS

AU       3540171       5/1973
CN       103708697 A   4/2014
(Continued)

OTHER PUBLICATIONS

Iceland Search Report for corresponding Iceland Application Serial No. EU 050142, dated Jun. 20, 2016, pp. 1-2.
(Continued)

*Primary Examiner* — David J Laux
(74) *Attorney, Agent, or Firm* — Tarolli, Sundheim, Covell & Tummino LLP

(57) ABSTRACT

The present invention relates to a new device, a system and a method for both cooking and drying or removing the water phase from material. The device of the present invention has a large area for heat exchange and scrapers which stir the material in the container rather than transferring it around in circles.

10 Claims, 4 Drawing Sheets

(51) Int. Cl.
*F26B 11/16* (2006.01)
*F26B 25/04* (2006.01)

(56) References Cited

U.S. PATENT DOCUMENTS

| | | | | |
|---|---|---|---|---|
| 4,279,295 A | * | 7/1981 | Duckworth | A23G 1/18 165/94 |
| 4,581,829 A | * | 4/1986 | Becker | F26B 23/004 34/402 |
| RE33,580 E | * | 4/1991 | Fraioli | A23B 4/01 126/92 AC |
| 5,197,205 A | * | 3/1993 | Spada | F26B 17/20 34/135 |
| 5,660,124 A | * | 8/1997 | Doncer | F26B 17/02 110/227 |
| 6,061,924 A | * | 5/2000 | Bolton | F26B 11/16 165/92 |
| 8,365,433 B2 | * | 2/2013 | Ogura | C05F 9/02 34/339 |
| 8,561,314 B2 | * | 10/2013 | Kruger | C10L 5/44 34/92 |
| 10,247,476 B2 | * | 4/2019 | Lim | F26B 11/14 |
| 10,527,349 B2 | * | 1/2020 | Palsson | F26B 3/10 |

FOREIGN PATENT DOCUMENTS

| | | |
|---|---|---|
| EP | 1553368 A1 | 7/2005 |
| EP | 2103892 A2 | 9/2009 |
| FR | 2712076 A1 | 5/1995 |
| WO | 2015/189864 A1 | 12/2015 |

OTHER PUBLICATIONS

PCT International Search Report and Written Opinion for corresponding International Application Serial No. PCT/US2017/050002, dated Feb. 10, 2017, pp. 1-68.

* cited by examiner

MECHANICAL VAPOR RECOMPRESSION APPARATUS

RELATED APPLICATIONS

The present application is a U.S. National Stage application under 35 USC 371 of PCT Application Serial No. PCT/IS2017/050002, filed on 10 Feb. 2017; which claims priority from IS Patent Application No. 050142, filed 10 Feb. 2016, the entirety of both of which are incorporated herein by reference.

FIELD

The present invention relates to a new device for drying material, such as organic material. More specifically the present invention relates to a dryer apparatus with disks and scrapers for heat exchange and evaporation of the water phase from any material.

INTRODUCTION

Prior art steam dryers are generally designed as a cylinder having a steam heated jacket throughout and a steam heated rotor, with hollow flights on the rotor. Material sticking to heat exchange surfaces makes control of drying problematic. These devices need to be cleaned very frequently, which is time consuming and prevents continuous use.

The problems with such device are insufficient scraping to prevent material build-up on the heating surface and material can burn thereon. Furthermore, it tends to be structurally heavy and expensive with a high resistance to rotation necessary for this application.

FR2712076 discloses a dryer for wet products comprising a row of parallel hollow circular discs spaced along the length of a chamber. The discs are fixed to the walls of the chamber and a heat-exchange fluid flows through these discs during the drying process. Plates, which are fixed to a rotating shaft containing scrapers for scraping the surfaces of the discs are arranged between the discs.

The MVR method (Mechanical Vapour Recompression) is well known in process industry normally used in falling film tube evaporators. The MVR technology tasks steam from evaporators and uses high pressure fans in a duct to increase the pressure and the temperature of the steam before introducing it back into the system to facilitate further evaporation in the system. The method is extremely energy economical compared with traditional multi-stage evaporation. It is however limited in that it is difficult and expensive to increase the pressure/temperature mechanically of more than a few degrees, which means that relatively big heating surfaces are needed for each kg evaporated.

CN103708697 discloses a traditional evaporation apparatus with discs on an axis where the heat exchange media enters the axis at one end and flows into the discs and out at the other end. A duct leading from the end where steam, which is used as a heat exchange media, exits the axis is directed in a duct via an MVR device and then back to the intake end of the axis. The problem with such a device is that new steam needs to be feed into the system as well to initiate the process. Furthermore, the middle part of the axis and the discs will eventually contain gases which reduces the heat exchange capacity of the system.

SUMMARY

Removal of the water phase from material, such as organic material in the production of high quality low-heat generated meal, is usually done by an evaporation process. The present invention provides a new device for both cooking and drying any material having a water phase.

The present invention provides a device and a method to overcome or ameliorate the aforementioned drawbacks of the prior art and to provide an improved and/or alternative and/or additional method or device for heating or removing a water phase from any material. The present invention provides a device with a simple and robust design with a large area for heat exchange and instead of moving the material in circles during rotation of the axis, the material is stirred with scrapers that scrape both the discs and the inner surface of the container. The present invention provides a faster process of cooking and drying and it prevents the material from burning on the surfaces of the device during the process. The heat exchange surface is therefore more efficient and the device easier to control. The present invention provides a device and a method where due to the fact that the discs do not connect to the whole circumference of the cylindrical portion of the container, in addition to the space above the discs, the organic material can travel easily from one space to another from the in-feed end to the out-feed end of the container. The present invention provides a device and a method where mechanical vapour recompression (MVR) technology is used to increase the temperature of the steam generated in the device and to use that steam to heat up at least a part of the heat exchange surfaces of the device. In a system and apparatus such as the one of the present invention, where steam from a boiler as well as secondary steam from the material being dried is used as heat exchange media, the secondary steam will always contain a large amount og light and heavy gases which will make the heat exchange process less efficient. By using individual discs which open into jackets surrounding the chamber, it is possible to use a set of discs for different jackets and thereby have different temperature and function in the part of the chamber with the different sets of discs and jackets. Furthermore, as the discs are connected to the jackets, it is possible to vent out the gases from the jackets during the process.

The present invention provides a new design which also provides a new type of dryer apparatus, where the function of dryer can be divided into two or more areas of the dryer chamber. One area can be defined by a separate jacket arranged around a part of the chamber of the dryer and conducting heating media from an outside source into the respective discs for that function area in the chamber. A second area can be defined by a separate jacket arranged around a part of the chamber using the MVR technology to take steam from the chamber and introducing the steam into the jacket for this function area. A third chamber can be defined by a separate jacket arranged around a part of the chamber and conducting steam from the chamber directly into the jacket arranged around this third function area of the dryer and thereby into the respective discs of that function area. The increased thermal conductivity, compared with conventional steam dryers, requires smaller heating surfaces to evaporate/dry a certain amount of moisture with relatively low temperature difference between sides.

It is the combination of a) the large area for heat exchange, b) the use of two or more sets of discs and jackets to divide the chamber into separate functional areas, and c) the use of the MVR technology to increase the temperature of the steam generated in the device and to use that steam to heat up at least a part of the heat exchange surfaces of the device, which provides the improved device resulting in an improved energy economical device and method for drying material. Furthermore, the device and the process provided by the present invention used for drying wet material only needs regulation by adjusting the amount of steam from a steam boiler into the first jacket to maintain a relatively constant low pressure inside the chamber. The new device also makes better use of the entire surface of the discs in the dryer. By using the MVR technology and effective large heat exchange surfaces obtained by individual discs connected to separate jackets, the apparatus of the present invention reduces considerably the energy usage in evaporation or drying of sticky liquid or of wet material.

The object(s) underlying the present invention is (are) particularly solved by the features defined in the independent claims. The dependent claims relate to preferred embodiments of the present invention. Further additional and/or alternative embodiments are discussed below.

The present invention provides an apparatus for heating or removing a water phase from material. The apparatus comprises a chamber for receiving material for drying, where the chamber further comprises an inlet for the material, a lower drying compartment with a cylindrical or semi-cylindrical shape, an upper steam portion for receiving steam from the lower drying compartment and an outlet for delivering or exiting dried material from the apparatus. The where the chamber is divided into at least a first and a second section, where the first section and the second section each comprise a set of heat exchange elements. The set of heat exchange elements comprises i) a first and second jacket arranged around their corresponding section, and ii) a plurality of cylindrical or semi-cylindrical disc-shaped hollow compartments, arranged parallel with space between them in the lower portion of the chamber, each cylindrical or semi-cylindrical disc-shaped hollow compartment comprising hollow protrusions connecting the disc-shaped hollow compartments to the corresponding jacket through connection openings. The apparatus further comprises an axis arranged centrally within the container and scrapers attached to, and rotating on the centrally arranged axis between the cylindrical or semi-cylindrical disc-shaped hollow compartments. The apparatus further comprises: a) a first duct leading to the first jacket of the first section for feeding steam under pressure from external source into the heat exchange elements of the first section, b) a second duct leading from the upper portion of the chamber to the jacket of the second section for feeding steam generated in the chamber into the heat exchange elements of the second section, wherein one or more high pressure fans in the duct between the upper steam portion and the jacket for increasing the pressure and the temperature of the steam before injecting it into jacket and its corresponding disc-shaped hollow compartments.

The invention can also be extended to provide such apparatus where the chamber is divided into three sections and the third section comprises third jacket receiving steam directly from the upper steam portion of the chamber through a duct.

The present invention also provides a system for heating or removing a water phase from material using the apparatus of the present invention. The system comprises feeding material comprising a water phase into a chamber, removing the water phase from the material using a heat exchange system which generates steam in the upper portion of the chamber, where a plurality of cylindrical or semi-cylindrical disc-shaped hollow compartments arranged parallel with space between them in the chamber comprise hollow protrusions connecting the disc-shaped hollow compartments to a jacket through connection openings in the lower drying compartment. The cylindrical or semi-cylindrical disc-shaped hollow compartments are divided into two sets of disks, where i) a duct provides steam through with increased temperature at increased pressure from an external source to the first jacket and the corresponding disc-shaped hollow compartments receiving, and ii) a duct between the upper steam portion and a second jacket having one or more high pressure fans is arranged in the duct the for increasing the pressure and the temperature of the steam from the upper portion of the chamber and feeding steam at a temperature above 100° C. into the second jacket and the corresponding cylindrical or semi-cylindrical disc-shaped hollow compartments. The system further comprises scraping the outer surface of disc-shaped hollow compartments and the inner surface of the lower drying compartment using scrapers attached to, and rotating on the centrally arranged axis within the container between the cylindrical or semi-cylindrical disc-shaped hollow compartments and feeding the dried material out of the chamber through the outlet.

The invention can also be extended to provide such a system for heating or removing a water phase from material using the apparatus of the invention chamber is divided into three sections, where the cylindrical or semi-cylindrical disc-shaped hollow compartments are divided into three sets of disks and wherein a third duct between the upper steam portion and a third jacket for feeding evaporation from the upper steam portion to a third jacket and the corresponding disc-shaped hollow compartments to warm up and start drying or cooking the material.

Therefore, each set of discs is connected to a corresponding jacket and receives steam from that corresponding jacket. The system further comprises scraping the outer surface of disc-shaped hollow compartments and the inner surface of the lower drying compartment using scrapers attached to, and rotating on the centrally arranged axis within the container between the cylindrical or semi-cylindrical disc-shaped hollow compartments. Finally the dried material is feed out of the chamber through the outlet.

The present invention also provides a method for heating or removing a water phase from material using the apparatus of the present invention. The method comprises the steps of i) feeding material comprising a water phase into a chamber, ii) removing the water phase from the material using a heat exchange system, where the heat exchange system of the apparatus is a two phase system and where the cylindrical or semi-cylindrical disc-shaped hollow compartments are divided into two sets of disks, wherein: in a first jacket, positioned around the first part of the lower drying compartment (near the inlet): iii) guiding steam from the upper steam portion 5 through a duct between the upper steam portion and the first jacket, iv) using one or more high pressure fans arranged in the duct the for increasing the pressure and the temperature of the steam the first jacket, and v) introducing steam at a temperature above 100° C. into the first jacket and into the cylindrical or semi-cylindrical disc-shaped hollow compartments. The method further comprises in a second jacket, positioned around the second part of the chamber near the outlet: vi) receiving steam with increased temperature at increased pressure from an external source, and vii) introducing steam at a temperature above 100° C. into the cylindrical or semi-cylindrical disc-shaped hollow compartments into the second jacket 6a for drying the material, wherein each set of discs receive steam from each of the three different jackets, viii) scraping the outer surface of disc-shaped hollow compartments and the inner surface of the lower drying compartment using scrapers attached to, and rotating on the centrally arranged axis within the container between the cylindrical or semi-cylindrical disc-shaped hollow compartments, and ix) feeding the dried material out of the chamber through the outlet.

The invention can also be extended to provide such a method for heating or removing a water phase from material using the apparatus of the present invention. The method further comprising the steps of: removing the water phase from the material where the heat exchange system of the apparatus is a three phase system and where the cylindrical or semi-cylindrical disc-shaped hollow compartments are divided into three sets of disks, where in a third jacket, positioned around the first part of the lower drying compartment the method involves feeding evaporation from the upper steam portion to the disc-shaped hollow compartments to warm up and start drying the material, wherein each set of discs receive steam from each of the three different jackets.

In the present context the terms "semi-cylindrical disc-shaped hollow compartments" and "discs" refers to the same item, namely the discs that are inserted into the container. The disks are not fully cylindrical as they contain connection members to connect to the jacket and a recess for receiving the axle rotating the scrapers. The discs may also have a relatively flat upper side. The connection members are also referred to as hollow protrusions.

In the present context, the bottom portion of the container is cylindrical so that the scrapers, which are arranged on the rotating axis, can scrape the inner side of the container as well as the discs. The upper portion may have any shape such as, but not limited to oval, cylindrical, square (as shown in the drawings) etc. as long as it does allow room the scrapers to rotate a whole circle around the axis. The upper portion forms an upper chamber to "loft" the stirred material and to collect the vapour or steam as a result of the heat exchange process.

All embodiments and definitions relate to the apparatus and the method of the invention.

In the present context the apparatus, the system and method relate to a device for drying material such as organic material for the production of fish-meal or meat-meal or for removing the water phase from salt for example, where the device can either be used as a cooker or a dryer/evaporator.

In an embodiment of the present invention, the scrapers extend fully to the inner surface of the container. Furthermore, the arm of each scrape has a spring element to push the scrape closer to the inner surface of the container when possible.

In an embodiment of the present invention, the container is raised at the in-feed end above the out-feed end of the container. This is to facilitate the material to slowly migrate from the in-feed end towards the out-feed end of the container.

In an embodiment of the present invention, the blade of the scrapers is shaped to direct the organic material over to the next space between two parallel and interspace arranged disc-shaped hollow compartments, from the in-feed end and towards the out-feed end of the container.

In an embodiment of the present invention, the inner surface of the container comprises vertical recesses leading to the connection openings in the side of the container.

In an embodiment of the present invention, the heating media within the jacket is a steam or vapour.

In an embodiment of the present invention, the apparatus is a cooker and/or a dryer.

In an embodiment of the present invention, an MVR device, connected in a duct between the upper steam portion of the device and a jacket, receives steam at 100° C. and increases the pressure in the duct resulting in a temperature increase in the steam to 105-115° C. when introduced into the discs through the jacket.

In an embodiment of the present invention, the apparatus further comprises second jacket receiving steam through an inlet in the jacket from an outside source. The temperature of the steam from an outside source is in the range of 105-130° C., such as 110-120, or 115-125, or 120-130. It is possible to introduce steam of higher temperature, but that my result in the material burning against the disc surface during the heat exchange.

In an embodiment of the present invention, the number of the one or more high pressure fans in the duct between the upper steam portion and the jacket for increasing the pressure and the temperature of the steam before injecting it into the disc-shaped hollow compartments surrounded by the jacket can be any applicable number such as, but not limited to one, two, three, four or five high pressure fans.

In an embodiment of the present invention, the cylindrical or semi-cylindrical disc-shaped hollow compartments are divided into three sets of disks, where each set is connected to their respective jacket.

In an embodiment of the present invention, the first jacket is positioned around the part of the lower drying compartment near the outlet receiving steam with increased temperature at increased pressure from an external source to continue drying the material.

In an embodiment of the present invention, a second jacket is positioned around the middle part of the lower drying compartment to feed steam with increased temperature at increased pressure from one or more fans to introduce heat into the apparatus and the system to continue drying the material.

In an embodiment of the present invention, a third jacket is positioned around the first part of the lower drying compartment, near the inlet, to feed evaporation from the upper steam portion to the disc-shaped hollow compartments to warm up and start drying the material or cooking the material.

In an embodiment of the present invention, the device further comprises valves in the top and bottom portion of each at least two jackets for releasing light and heavy gasses respectively from the jackets.

In an embodiment of the present invention, the chamber is divided into three sections and the third section comprises third jacket receiving steam directly from the upper steam portion of the chamber through a duct.

In an embodiment of the present invention, the amount of steam under pressure injected into the first jacket of the chamber can be adjusted to maintain the pressure in the dryer at a predefined range.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DESCRIPTION OF VARIOUS EMBODIMENTS

Figure 1:
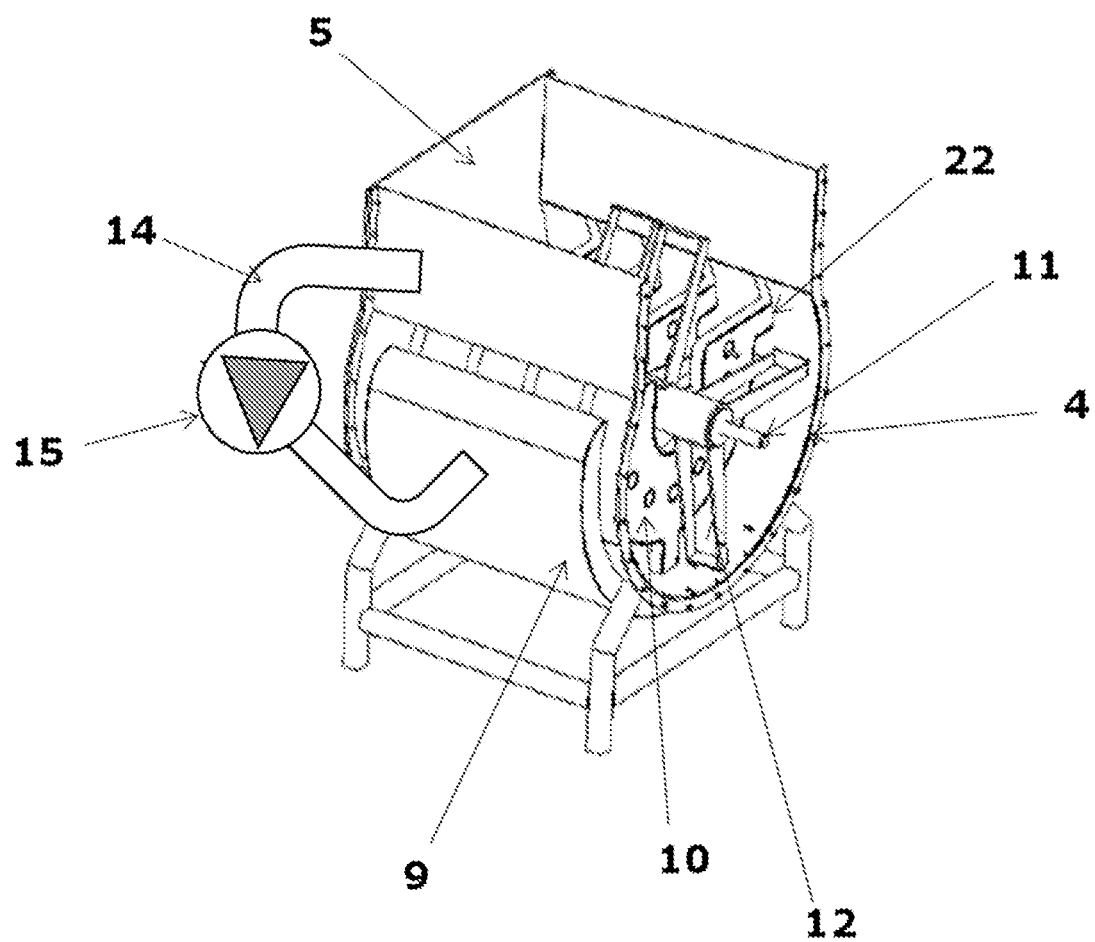
FIG. 1 is a schematic illustration showing a simplified embodiment of the Mechanical Vapour Recompression (MVR) function according to one aspect of the present disclosure.

In the following, exemplary embodiments of the invention will be described, referring to the figures. The embodiments shown in the drawings are explained with reference numbers. These examples are provided to provide further understanding of the invention, without limiting its scope. The skilled person will understand that the drawings, described below, are for illustration purposes only. The drawings are not intended to limit the scope of the present teachings in any way.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

FIG. 1 shows a simplified embodiment of the MVR function, where a dryer has a single jacket 9 connected to the upper steam portion 5 of the chamber where a high pressure fan 15 is arranged in the duct 14 between the upper steam portion 5 and the jacket 9. The disc-shaped hollow compartments 10 are shown parallel arranged with space between them in the lower drying compartment 4, where a connection portion on each side of the upper side of the disc sits in a recess on each side of the inner side of the lower drying compartment 4. Upon assembly, the upper side of the container 5 is open and therefore the various components of the device, such as discs, axis and scrapers can be arranged and adjusted within the container before it is closed. The discs 10 are not connected directly as the axis 11 is not connected to the discs but merely has the function of rotating the scrapers 12. The figure shows that the scrapers in each space between two disc-shaped hollow compartments can be in a different position as compared to the scrapers in the next space between two disc-shaped hollow compartments. The figure also shows that the discs 10 do not connect to the whole circumference of the cylindrical portion of the container, but connect to the inner surface of the container through connection members 22 in the disc-shaped hollow compartments on each upper side and one centrally in the bottom of the container. This provides open spaces between connection members 22 where part of the material flows through from the inlet towards the outlet side of the chamber.

Figure 2:
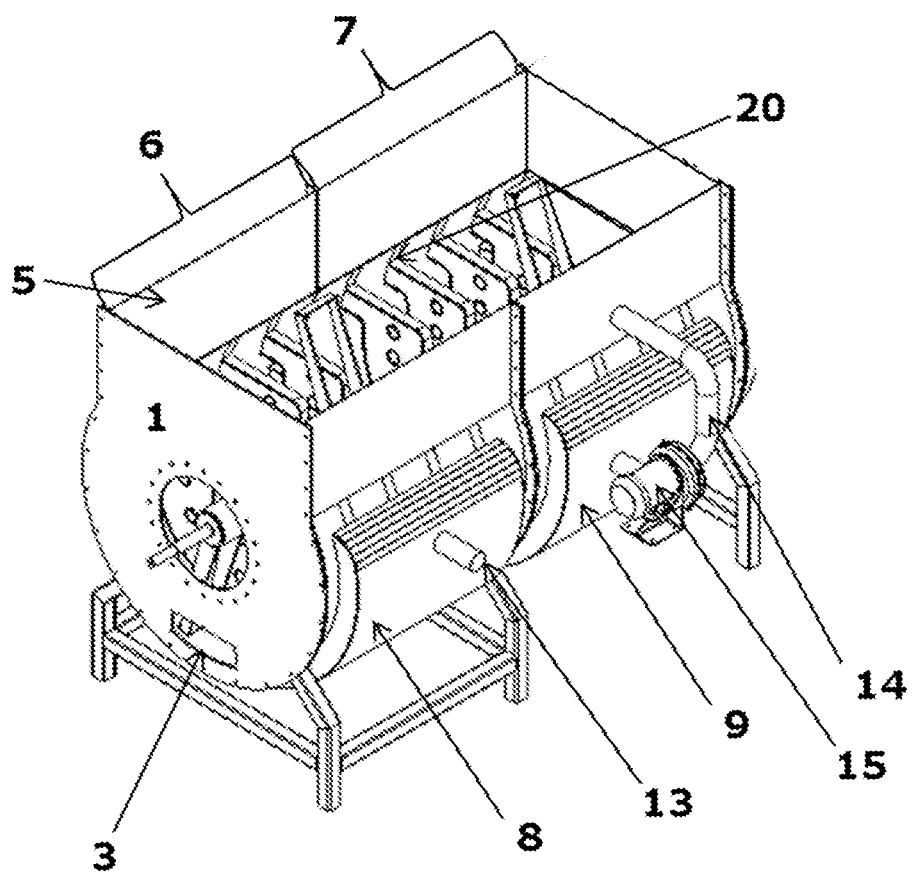
FIG. 2 shows an apparatus according to another embodiment of the present disclosure for heating or removing a water phase from hydrous material.

FIG. 2 shows an apparatus according to claim 1 of the present invention for heating or removing a water phase from hydrous material. The apparatus comprises a chamber 1 for receiving material. The chamber has an inlet (not shown in this drawing) for the material to be dried, a lower drying compartment 4 with a cylindrical shape, an upper steam portion 5 for receiving steam from the lower drying compartment and an outlet (not shown in this fig) for delivering the dried material. The dryer shown in FIG. 2 is divided into two dryer sections 6, 7 having two jackets 8, 9 arranged around the container 1 and a plurality of cylindrical or semi-cylindrical disc-shaped hollow compartments 10 comprise hollow protrusions 22 which connect a set of disc-shaped hollow compartments 10 to their respective jacket 8, 9 of each section 6, 7. The connection from each disc-shaped hollow compartment 10 to a respective jacket 8, 9 is through connection openings (20) in the lower drying compartment 4. An outlet 3 is shown at one end of the container.

Figure 3:
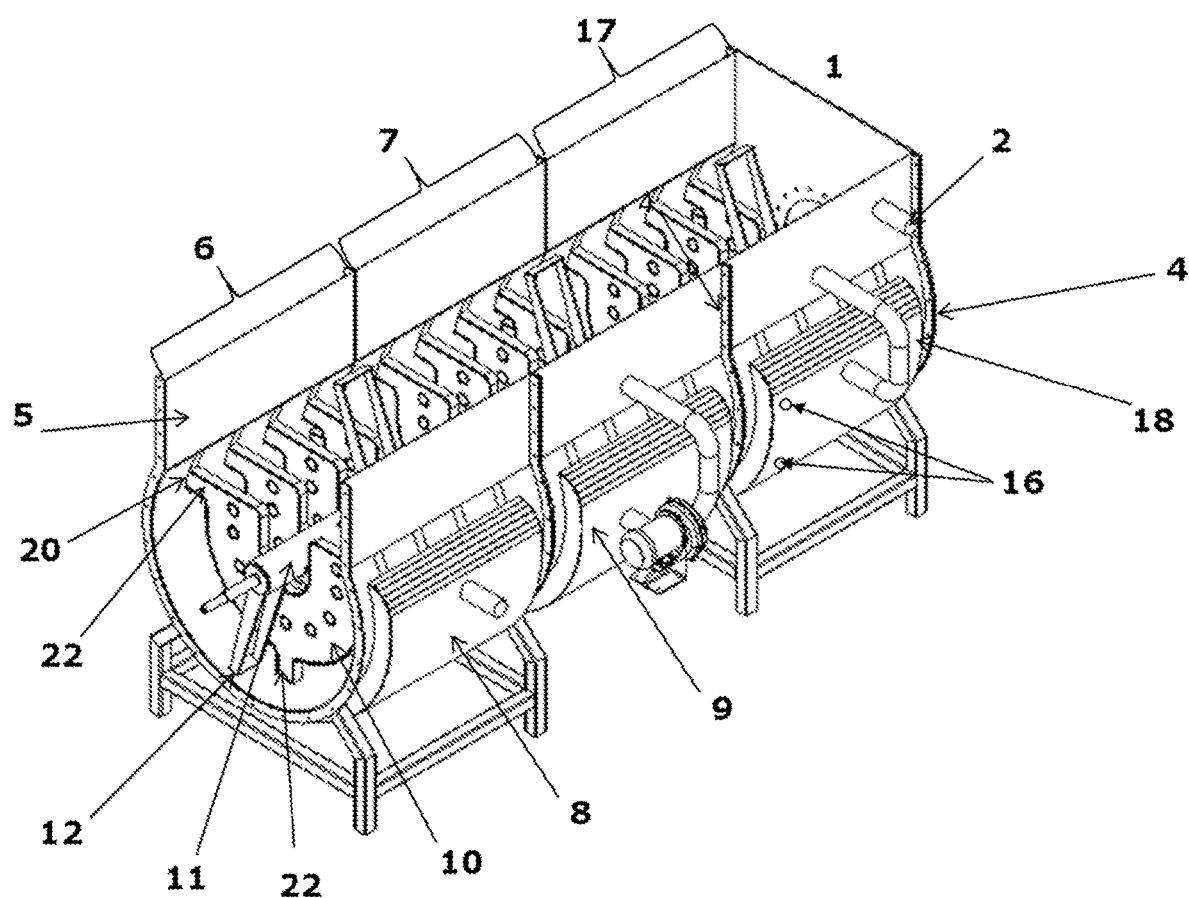
FIG. 3 shows an apparatus according to yet another embodiment of the present disclosure for heating or removing a water phase from hydrous material.

FIG. 3 shows an apparatus according to the present invention for heating or removing a water phase from hydrous material. The apparatus comprises a chamber 1 for receiving material. The chamber has an inlet 2 for the material to be dried, a lower drying compartment 4 with a cylindrical shape, an upper steam portion 5 for receiving steam from the lower drying compartment and an outlet (not shown in this drawing) for exiting the dried material. The chamber of the apparatus is divided into three sections 6, 7 and 17, having three jackets 8, 9, 18 arranged around the container 1 and a plurality of cylindrical or semi-cylindrical disc-shaped hollow compartments 10 comprise hollow protrusions 22 which connect a set of disc-shaped hollow compartments 10 to their respective jacket 8, 9, 18 of each section 6, 7, 17. The connection from each disc-shaped hollow compartment 10 to a respective jacket is through a connection between hollow protrusions 22 in the discs and connection openings 20 in the lower drying compartment 3. FIG. 3 also shows valves 16 for exiting heavy and light gases from the steam.

Figure 4:
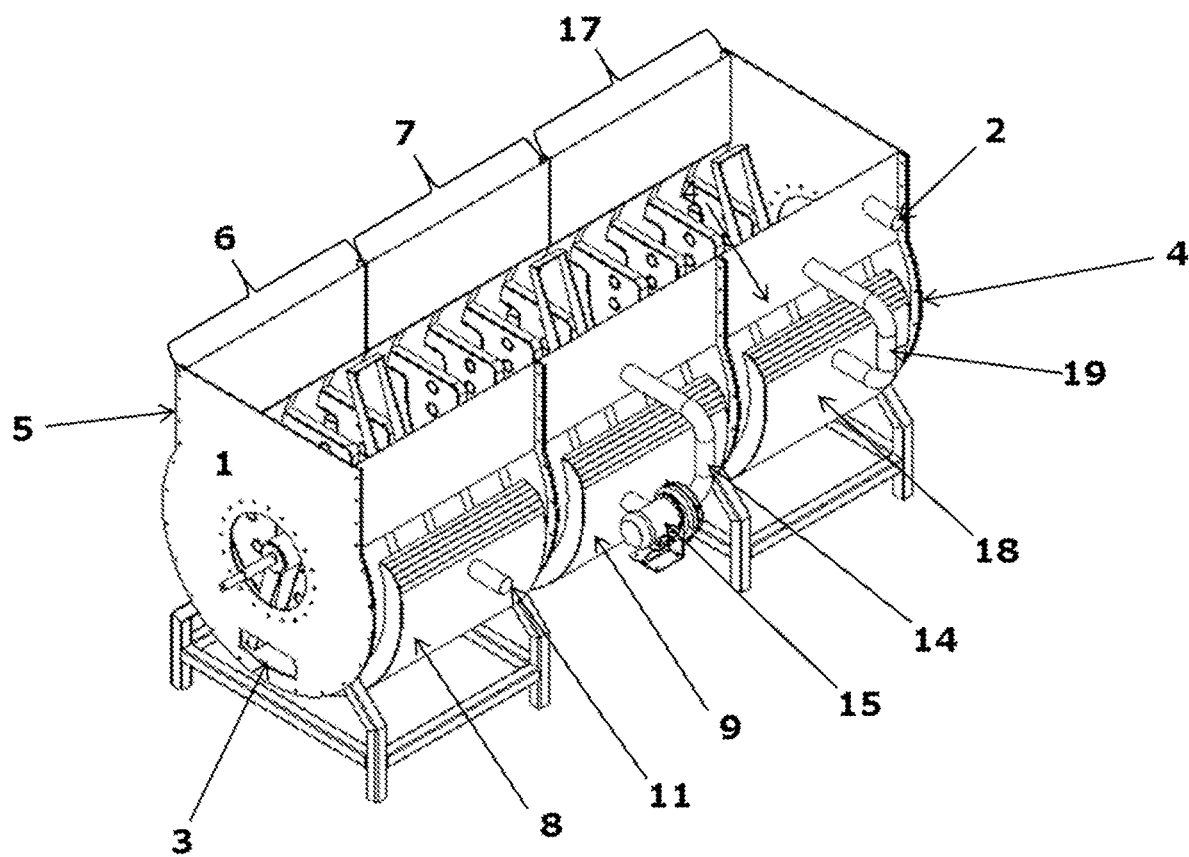
FIG. 4 outlines the heat exchange mechanism of an apparatus according to the embodiment shown in FIG. 3.

FIG. 4 outlines the heat exchange mechanism of an apparatus according to the embodiment shown in FIG. 3, where the apparatus has 3 different jackets and three different means for providing the heating media. The apparatus comprises a chamber 1 for receiving material having an inlet 2, a lower drying compartment 3 with a cylindrical shape, an upper steam portion 4 for receiving steam from the lower drying compartment and an outlet 5. The chamber of the apparatus is divided into three sections 6, 7 and 17, where section 17 can either be a dryer section or a cooker section. The dryer apparatus shown in FIG. 4 has three jackets 8, 9, 18 arranged around the cylindrical lower part of the container 1 and a plurality of cylindrical or semi-cylindrical disc-shaped hollow compartments 10 comprise hollow protrusions 22 which connect a set of disc-shaped hollow compartments 10 to their respective jacket 8, 9, 18. Therefore, the cylindrical or semi-cylindrical disc-shaped hollow compartments 10 are divided into 3 sets of disks, where each set is connected to their respective jacket 8, 9, 18. The connection from each disc-shaped hollow compartment 10 to a respective jacket 6 is through connection openings (as explained above) in the lower drying compartment 4. In this embodiment the first jacket 8 is positioned around the part of the lower drying compartment 3, near the outlet for the material. The first jacket 8 receives steam with increased temperature at increased pressure through a duct 13 from an outside source to initiate the drying process and bringing energy into the system. In the embodiment shown in FIG. 3, a steam of 130° C. is introduced into first jacket 8 at a 2-3 bar pressure. The second jacket 9 is arranged around the middle portion of the lower drying compartment 4. A steam duct 14 leads from the upper steam portion 5 into the second jacket 9 with one high pressure fan 15 arranged in the duct 12 between the upper steam portion 5 and the second jacket 9 for increasing the pressure and the temperature of the steam taken from the upper steam portion 5 before injecting it into the respective disc-shaped hollow compartments 10 surrounded by the second jacket 9. The third jacket 18 is positioned around the first part of the of the lower drying compartment 4 (near the inlet) to feed evaporation or waste energy from the upper steam portion 5 directly, through a third steam duct 19, to the respective set of disc-shaped hollow compartments 10 to warm up and start drying or cooking the material.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 5" shall also cover exactly 5 or "substantially constant" shall also cover exactly constant).

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. An apparatus for heating or removing a water phase from material, the apparatus comprising:
    a chamber (1),
    an inlet (2),
    an outlet (3),
    where the chamber has a lower portion (4) with a cylindrical or semi-cylindrical shape and an upper portion (5) closing the chamber and where the chamber is divided into at least a first (6) and a second (7) section, said chamber having,
    wherein the first section (6) and the second section (7) each comprise a set of heat exchange elements, said set of heat exchange elements comprising:
        a first (8) and second jacket (9) arranged around their corresponding section, and
        a plurality of cylindrical or semi-cylindrical disc-shaped hollow compartments (10), arranged parallel with space between them in the lower portion of the chamber, each cylindrical or semi-cylindrical disc-shaped hollow compartment comprising hollow protrusions (22) connecting the disc-shaped hollow compartments to the corresponding jacket through connection openings (20),
    wherein the device further comprises:
        an axis (11) arranged centrally within the container, and
        scrapers (12) attached to, and rotating on the centrally arranged axis (11) between the cylindrical or semi-cylindrical disc-shaped hollow compartments (10),
    wherein the apparatus further comprises
        a first duct (13) leading to the first jacket of the first section (6) for feeding steam under pressure from an external source into the heat exchange elements of the first section (6),
        a second duct (14) leading from the upper portion (5) of the chamber (1) to the second jacket (9) of the second section (7) for feeding steam generated in the chamber into the heat exchange elements of the second section, and
        one or more high pressure fans (15) in the duct (14) between the upper steam portion (5) and the second jacket (9) for increasing the pressure and the temperature of the steam before injecting it into the second jacket (9) and its corresponding disc-shaped hollow compartments (10).

2. The apparatus according to claim 1, further comprising valves (16) in the top and bottom portion of the first (8) and second (9) jackets for releasing light and heavy gasses respectively from the first (8) and second (9) jackets.

3. The apparatus according to claim 1, wherein the apparatus is a cooker and/or a dryer.

4. The apparatus according to claim 1, wherein the chamber is divided into three sections and the third section (17) comprises third jacket (18) receiving steam directly from the upper steam portion (5) of the chamber through a duct (19).

5. The apparatus according to claim 4, wherein
    the first jacket (8) is positioned around the part of the lower drying compartment (4) receiving steam with increased temperature at increased pressure from the external source to continue drying the material, and
    the second jacket (9) is positioned around the middle part of the lower drying compartment (4) to feed steam with increased temperature at increased pressure from the fans (15) to warm up and start drying the material and to continue drying the material,
    the third jacket (18) is positioned around the first part of the lower drying compartment (4) to feed evaporation from the upper steam portion (5) to the disc-shaped hollow compartments (10) to cook or warm up and start drying the material.

6. A system for heating or removing a water phase from material using the apparatus of claim 5, the system comprising:
    feeding material comprising a water phase into a chamber (1),
    removing the water phase from the material using a heat exchange system which generates steam in the upper portion (5) of the chamber, where a plurality of cylindrical or semi-cylindrical disc-shaped hollow compartments (10) arranged parallel with space between them in the chamber (1) comprise hollow protrusions (22) connecting the disc-shaped hollow compartments (10) to a jacket through connection openings (20) in the lower drying compartment (4), wherein the cylindrical or semi-cylindrical disc-shaped hollow compartments (10) are divided into three sets of disks, and wherein:
        a duct (13) provides steam through with increased temperature at increased pressure from an external source to the first jacket (8) and the corresponding disc-shaped hollow compartments (10) receiving, a duct (14) between the upper steam portion (5) and a second jacket (9) having one or more high pressure fans (15) is arranged in the duct (14) the for increasing the pressure and the temperature of the steam from the upper portion (5) of the chamber and feeding steam at a temperature above 100° C. into the second jacket (9) and the corresponding cylindrical or semi-cylindrical disc-shaped hollow compartments (10), a third duct (21) between the upper steam portion (5) and the third jacket (18) for feeding evaporation from the upper steam portion (5) to a third jacket (18) and the corresponding disc-shaped hollow compartments (10) to warm up and start drying the material, scraping the outer surface of disc-shaped hollow compartments (10) and the inner surface of the lower drying compartment (4) using scrapers (12) attached to, and rotating on the centrally arranged axis (11) within the container (1) between the cylindrical or semi-cylindrical disc-shaped hollow compartments (10), feeding the dried material out of the chamber through the outlet (3).

7. A system according to claim 6 further comprising automatically adjusting the amount of steam under pressure injected into the first jacket (8) of the chamber to maintain the pressure in the first dryer at a predefined range.

8. A method for heating or removing a water phase from material using the apparatus of claim 5, the method comprising:

feeding material comprising a water phase into a chamber, removing the water phase from the material using a heat exchange system, where the heat exchange system of the apparatus is a three phase system and where the cylindrical or semi-cylindrical disc-shaped hollow compartments are divided into three sets of disks, wherein:

in a first jacket, positioned around the middle part of the lower drying compartment:
  guiding steam from the upper steam portion through a duct between the upper steam portion (5) and the first jacket,
  using one or more high pressure fans arranged in the duct the for increasing the pressure and the temperature of the steam the first jacket, and
  introducing steam at a temperature above 100° C. into the first jacket and into the cylindrical or semi-cylindrical disc-shaped hollow compartments, in a second jacket, positioned around the part of the chamber:
  receiving steam with increased temperature at increased pressure from an external source, and
  introducing steam at a temperature above 100° C. into the cylindrical or semi-cylindrical disc-shaped hollow compartments into the second jacket for drying the material, in a third jacket, positioned around the first part of the lower drying compartment:
  feeding evaporation from the upper steam portion to the disc-shaped hollow compartments to warm up and start drying the material, wherein each set of discs receive steam from each of the three different jackets, scraping the outer surface of disc-shaped hollow compartments and the inner surface of the lower drying compartment using scrapers attached to, and rotating on the centrally arranged axis within the container between the cylindrical or semi-cylindrical disc-shaped hollow compartments, feeding the dried material out of the chamber through the outlet.

9. A system for heating or removing a water phase from material using the apparatus of claim 1, the system comprising:

feeding material comprising a water phase into a chamber (1), removing the water phase from the material using a heat exchange system which generates steam in the upper portion (5) of the chamber, where a plurality of cylindrical or semi-cylindrical disc-shaped hollow compartments (10) arranged parallel with space between them in the chamber (1) comprise hollow protrusions (22) connecting the disc-shaped hollow compartments (10) to a jacket through connection openings (20) in the lower drying compartment (4), wherein the cylindrical or semi-cylindrical disc-shaped hollow compartments (10) are divided into two sets of disks, and wherein:

a duct (13) provides steam through with increased temperature at increased pressure from an external source to the first jacket (8) and the corresponding disc-shaped hollow compartments (10) receiving, a duct (14) between the upper steam portion (5) and a second jacket (9) having one or more high pressure fans (15) is arranged in the duct (14) the for increasing the pressure and the temperature of the steam from the upper portion (5) of the chamber and feeding steam at a temperature above 100° C. into the second jacket (9) and the corresponding cylindrical or semi-cylindrical disc-shaped hollow compartments (10), scraping the outer surface of disc-shaped hollow compartments (10) and the inner surface of the lower drying compartment (4) using scrapers (12) attached to, and rotating on the centrally arranged axis (11) within the container (1) between the cylindrical or semi-cylindrical disc-shaped hollow compartments (10), feeding the dried material out of the chamber through the outlet (3).

10. A method for heating or removing a water phase from material using the apparatus of claim 1, the method comprising:

feeding material comprising a water phase into a chamber, removing the water phase from the material using a heat exchange system, where the heat exchange system of the apparatus is a two phase system and where the cylindrical or semi-cylindrical disc-shaped hollow compartments are divided into two sets of disks, wherein:

in a first jacket, positioned around the first part of the lower drying compartment:
  guiding steam from the upper steam portion (5) through a duct between the upper steam portion and the first jacket,
  using one or more high pressure fans arranged in the duct the for increasing the pressure and the temperature of the steam the first jacket, and
  introducing steam at a temperature above 100° C. into the first jacket and into the cylindrical or semi-cylindrical disc-shaped hollow compartments, in a second jacket, positioned around the second part of the chamber:

receiving steam with increased temperature at increased pressure from an external source, and introducing steam at a temperature above 100° C. into the cylindrical or semi-cylindrical disc-shaped hollow compartments into the second jacket (6a) for drying the material, wherein each set of discs receive steam from each of the three different jackets, scraping the outer surface of disc-shaped hollow compartments and the inner surface of the lower drying compartment using scrapers attached to, and rotating on the centrally arranged axis within the container between the cylindrical or semi-cylindrical disc-shaped hollow compartments, feeding the dried material out of the chamber through the outlet.

* * * * *